United States Patent Office 3,304,157
Patented Feb. 14, 1967

3,304,157
PROCESS FOR THE RECOVERY OF PHOSPHORIC ACID FROM AQUEOUS REACTION MIXTURES PRODUCED BY THE DECOMPOSITION OF TRI-CALCIUM PHOSPHATE WITH HYDROCHLORIC ACID
Avraham M. Baniel, Haifa, and Ruth Blumberg, Mount Carmel, Haifa, Israel, assignors, by mesne assignments, to Israel Mining Industries for Research and Development, a company of Israel
No Drawing. Filed Aug. 13, 1962, Ser. No. 216,322
Claims priority, application Israel, Aug. 20, 1961, 15,920
14 Claims. (Cl. 23—165)

It is known that tricalcium phosphate, including rock phosphate associated with various minerals such as, for example, calcium carbonate and calcium fluoride, can be decomposed with aqueous hydrochloric acid, whereby an aqueous liquor containing principally $PO_4{}^{---}$, $Cl^-$, $Ca^{++}$ and $H^+$ is obtained. This liquor will hereinafter be referred to, for short, as "decomposition liquor."

It is further known that phosphoric acid can be extracted from the decomposition liquor by means of an organic solvent for phosphoric acid which is of limited miscibility with pure water and also with water containing calcium and chlorine ions. Organic solvents so far known to be suitable as extractants for this purpose are aliphatic alcohols having three or more carbon atoms in the molecule as well as various ketones.

For these solvents the distribution coefficient of phosphoric acid between the organic and aqueous phases, i.e. the ratio of the concentration of phosphoric acid in the organic and aqueous phases, respectively, is as a rule below 1, which makes it necessary to use larger volumes of the extractant than of the aqueous phase. For this reason, and also for considerations which will be set out below, it is desirable to provide alternative solvents for use in the extraction of phosphoric acid from decomposition liquors.

The decomposition liquor can contain up to about 140 g./l. of $P_2O_5$ in addition to considerable quantities of calcium chloride and of unreacted hydrochloric acid. In order to be suitable for the extraction of phosphoric acid from such a liquor the solvent has to possess a pronounced selective extractive power towards phosphoric acid as compared to its extractive power towards calcium chloride. Moreover, the phosphoric acid extracted by this solvent must be readily separable and recoverable from the solvent, e.g. by back extraction with pure water.

From the fact that all solvents hitherto known to be suitable for the extraction of phosphoric acid from the decomposition liquor contain oxygen it could have been inferred that other oxygen-containing solvents, e.g. esters such as amyl actetate, ethyl acetate, di-n-butyl phthalate, or ethers, nitrobenzene or m-cresol would also be suitable for the same purpose. However, it has been found that neither the solvents nor, for example, various esters of phosphoric acid or various amines are suitable for the purpose aforesaid; and no rules could be established by which the chemical nature of the extractant could be correlated to the above specified required properties.

It has now surprisingly been found that certain organic amides are very suitable solvents for the preferential extraction of phosphoric acid from a decomposition liquor. With these solvents the distribution coefficient of phosphoric acid between the organic and aqueous phases is in most cases above 1 and the recovery of the phosphoric acid from the solvent is easy.

Accordingly the invention consists in a process for the recovery of phosphoric acid by solvent extraction from the aqueous reaction mixture produced by the decomposition of tricalcium phosphate with hydrochloric acid in an aqueous reaction system, wherein the extractant solvent is an amide of one of the following general formulae

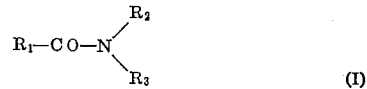

(I)

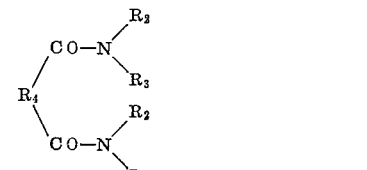

(II)

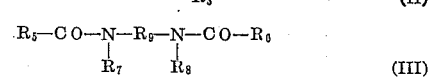

(III)

in which $R_1$, $R_5$, $R_6$, $R_7$ and $R_8$ are the same or different and stand for hydrogen or a hydrocarbon radical; $R_2$ and $R_3$ are the same or different and stand for hydrogen or a hydrocarbon radical, or $R_2$ and $R_3$ form together with the nitrogen to which they are attached a heterocyclic ring system; $R_4$ is a hydrocarbon radical and $R_9$ is a divalent hydrocarbon radical.

The extractant solvents according to the invention have a higher extractive power towards phosphoric acid than have the solvents employed hitherto for the same purpose.

For example, if a given quantity of n-butanol extracts 100 parts by weight of phosphoric acid from a given decomposition liquor, the same quantity of N,N-di-n-butyl acetamide extracts 175 parts by weight of phosphoric acid from the same liquor.

The extractants according to the invention may be used by themselves or in admixture with other solvents, e.g. butanols and pentanols with which they are completely miscible, or hydrocarbon solvents. This makes possible a wide range of combinations. For example, a high-molecular amide may be preferred as extractant to one of the alcohols aforesaid, since owing to the negligible solubility of the amide in water the decomposition liquor can be discarded after the extraction without having to undergo a treatment for the recovery of solvent. However, those amides according to the invention which are solid at room temperature cannot be used by themselves in a liquid-liquid extraction process. A mixture of such an amide with a suitable quantity, say 20%, of a solvent, e.g. iso-amyl alcohol, forms a liquid solvent having a convenient viscosity and a solvent power substantially equal to that of iso-amyl alcohol itself, but in this case the quantity of iso-amyl alcohol remaining dissolved in the aqueous liquor is so small that the recovery thereof can be dispensed with.

Another suitable mixture may be composed from an amide of somewhat lower molecular weight and greater solvent power, iso-amyl alcohol and a hydrocarbon, e.g. xylene. Such a mixture, again, can be so composed as to have substantially the same solvent power per unit volume of solvent as has iso-amyl alcohol by itself, while the dissolution of iso-amyl alcohol in the aqueous decomposition liquor becomes negligible.

On the whole the amides used as extractant solvents according to the invention have a greater extraction power towards phosphoric acid contained in a decomposition liquor than have the alcohols and ketones known to be suitable for the same purpose. These amides can therefore be used in relatively smaller quantities. For the same reason the concentration of phosphoric and hydrochloric acids in the extract is higher than in the case of the solvents hitherto proposed for the same purpose, and by re-extraction with water from the solvent extract these two acids are obtained in the form of aqueous solution of higher concentration than hitherto. This has the advantage that the subsequent separation of hydrochloric acid from the phosphoric acid by distillation is rendered easier.

Furthermore, in contrast to the alcohols used hitherto as extractants of phosphoric acid, whose solvent power towards phosphoric acid does not markedly change in the range of the temperatures at which the extraction process can be carried out in practice and at which the solvents are stable in the presence of acids, the solvent power of many of the amide extractants according to the invention markedly varies with the temperature. This property makes it possible to carry out the extraction at a temperature at which the solubility of phosphoric acid in the amide solvent is increased and then, after separation of the phases, to vary the temperature of the extract so as to reduce the solubility of the phosphoric acid in the solvent and thereby to facilitate the recovery of the phosphoric acid.

The recovery of $P_2O_5$ in the total process, including the decomposition of tricalcium phosphate, and in particular rock phosphate, with aqueous hydrochloric acid, the extraction of phosphoric acid with an amide extractant according to the invention and the recovery of the phosphoric acid from the solvent extract, is of the order of 96–98, i.e. similar to that of the same process if alcohols or ketones are used as extractants. As in the case of use of these latter extractants the extraction with the aid of the amide extractants according to the invention can be carried out in batches or continuously, countercurrent contact being preferred in the latter case.

The recovery of phosphoric acid from the organic solvent phase and its separation from co-extracted hydrochloric acid can be effected in different ways.

The simplest method, especially applicable to the case of amide extractants having low solubility in water, is by way of washing the solvent extract with water.

Where washing with water does not completely remove the phosphoric acid from the solvent extract or the quantities of water required for this purpose would be too large—and the phosphoric acid thus recovered would correspondingly become diluted—another method may be chosen according to which the solvent extract is mixed with a second solvent which is miscible with the extractant solvent but does not dissolve aqueous phosphoric acid, e.g. benzene or another hydrocarbon solvent. By this operation a new two-phase system is created in which the top phase consists of the mixture of solvents and the bottom phase consists of a concentrated aqueous mixture of phosphoric and hydrochloric acids. For the recovery of the entire quantity of these acids originally extracted from the reaction mixture into the first solvent, the addition of some water may be necessary for washing the top phase, either before or after its separation from the bottom phase. The two phases can readily be separated. From the aqueous phase the hydrochloric acid can be removed by distillation or stripping with hot air or another gas, whereby the phosphoric acid is left as a residue. From the solvent mixture the two solvents can be recovered singly by fractional distillation. Both of them may be recycled.

By yet another method the solvent extract may be subjected directly to a thermal treatment such as distillation or stripping whereby concentrated aqueous phosphoric acid is obtained as a residue while the expelled solvent and hydrochloric acid can be collected separately.

The invention is illustrated by the following example to which it is not limited:

Ground rock phosphate containing 34.5% of $P_2O_5$ was introduced with stirring into aqueous hydrochloric acid of 22% by weight strength, in a proportion of 100 g. of phosphate for each 270 ml. of acid. When the reaction was terminated and the froth had subsided, the aqueous decomposition liquor was separated from undissolved solid matter. This liquor ("liquor A") contained 12% by weight of $H_3PO_4$ and some free HCl.

A portion of 1000 ml. of this liquor was extracted in countercurrent with a mixed extractant composed of 400 g. of a commercial mixture of N,N-dimethyl caprylamide and capramide and 100 g. of water. The extract ("extract B"), separated from the calcium chloride brine ("raffinate C") contained 20% by weight of $H_3PO_4$, most of the free hydrochloric acid originally present in the aqueous phase and about 2% by weight of calcium chloride. The extract B was first freed from calcium chloride by being washed with a small quantity of the aqueous acid ("extract D") obtained by the subsequent extraction of the solvent-extract with water, as described below. Thereafter the extract B was washed in countercurrent with water whereby virtually all the phosphoric and hydrochloric acids were transferred into the aqueous phase ("extract D") and an aqueous solvent mixture ("raffinate E") was left. From the extract D, hydrochloric acid was recovered by distillation in order to be used for the decomposition of another batch of rock phosphate. The residue remaining after the distillation of the HCl was a concentrated aqueous solution of phosphoric acid.

The raffinate E contained an appreciable proportion of water. It was partially dehydrated by being contacted with the calcium chloride brine (raffinate C) in order to reconstitute the ratio of amide:water in the raffinate E to the original value indicated above. At the same time any amount of phosphoric or hydrochloric acid still remaining in the raffinate C after the removal of extract B was extracted by this operation into the raffinate E. After this operation the reconstituted solvent mixture could be used again as an extractant for the removal of phosphoric and hydrochloric acids from another portion of liquor A.

The solubility of the solvent in the brine is so low (less than 0.15% v./v.) that in actual practice the brine raffinate C may be evacuated from the system without undergoing any operation for the recovery of residual solvent.

Instead of effecting partial dehydration of the raffinate E by contact with calcium chloride brine (raffinate C), it is also possible to heat the solvent-water mixture (raffinate E) to 50° C. whereby about half of the dissolved water is separated as a distinct layer which can be removed. The solvent raffinate thus concentrated can be recycled to the extraction stage while the water thus separated can be used again in the operation of washing the extract B.

The process described above may be further modified within the scope of the invention, e.g. as follows (the indication of quantities below refer to the quantities of decomposition liquor (liquor A) and extractant according to the preceding specific example):

(a) For the removal of calcium chloride co-extracted with the acid into the organic phase (extract B), the latter may be heated to about 50° C. and then be washed with 35 g. of $H_2O$. The concentrated aqueous calcium chloride solution (extract F) is recycled to a new portion of liquor A. The solvent extract (extract B) is then washed with water in countercurrent at 50° C. whereby the entire acid is transferred to the aqueous phase (extract G). This extract G is further treated in the same manner as extract D above.

(b) The solvent extract B, separated from the raffinate C, is admixed with 100 g. of benzene and the mixture is washed with 35 g. of $H_2O$ whereby the calcium chloride is extracted. The concentrated aqueous calcium chloride solution (extract H) is recycled to a new portion of liquor A. The washed solvent extract (extract B+benzene) is then washed with water in countercurrent at room temperature whereby virtually the total amount of acids is transformed to the aqueous phase (extract J). This extract J is further treated as described above for extract D.

From the solvent mixture thus extracted, the benzene can be separated by distillation. The residual amide mixture and the benzene distillate may be re-used each by itself in the process.

The following solvents and solvent mixtures have also been found to be suitable extractants for the recovery of phosphoric acid from aqueous liquors produced by the decomposition of rock phosphate with hydrochloric acid as an aqueous medium:

(1) Caproyl-piperidine.

(2) N,N-dibutyl-acetamide: In this case the raffinate brine contains about 1% of dissolved amide which can be recovered, e.g. by scrubbing with benzene.

(3) A mixture consisting of N,N-dibutyl-acetamide, kerosene and water, e.g. in a proportion of 400:100:100. The presence of kerosene in this mixture has the double effect of practically eliminating any co-extraction of calcium chloride so that no preliminary washing of the solvent extract is necessary, and of so much decreasing the solubility of the amide in the decomposition liquor that the raffinate brine need not be treated for the recovery of dissolved solvent.

(4) N-n-propyl-caproamide: The solubility of this solvent in the aqueous decomposition liquors is sufficiently low so that the raffinate brine need not be treated for the recovery of dissolved solvent.

(5) N-n-butyl-caproamide: In this case, too, no solvent recovery from the brine is necessary.

(6) A mixture of about equal parts by weight of N-n-propyl-lauramide which is solid at ambient temperature, and N-n-butyl-acetamide: While the latter is completely miscible with water at ambient temperature, the mixture as a whole is so little soluble in the aqueous decomposition liquor that the raffinate brine need not be treated for the recovery of solvent. Any amount of calcium chloride passing into the extract can be removed by heating the latter, e.g. to about 50° C. and washing it with water in countercurrent at such elevated temperature.

(7) A mixture of about equal parts by weight of N-cyclohexyl-caproamide which is solid at ambient temperature and n-butyl alcohol: In this case, too, the solubility of the solvent mixture in the decomposition liquor at ambient temperature is so low that the recovery of solvent from the raffinate is not required.

(8) N-n-butyl-acetamide: This solvent is completely miscible with water at ambient temperature, but only partly with the aqueous decomposition liquor.

(9) A mixture of about 70 parts by weight of N-N-dimethyl-lauramide and about 30 parts by weight of N-n-butyl-acetamide.

(10) A mixture of about 70 parts by weight of N-N-dimethyl-oleamide and about 30 parts by weight of N-n-butyl-acetamide.

(11) A mixture of about equal parts by weight of N-o-tolyl-oleamide and iso-amyl alcohol.

(12) Caproyl-morpholine.

(13) N,N-butyl-cyclohexyl-caproamide.

(14) A mixture of about equal parts by weight of ethylene-bis-propionamide and n-butyl alcohol.

(15) A mixture of about equal parts by weight of N,N'-dibutyl-glutardiamide and n-butyl alcohol.

What we claim is:

1. A process for the recovery of phosphoric acid, comprising the steps of extracting phosphoric acid by means of an organic solvent from an aqueous reaction mixture produced by the decomposition of tricalcium phosphate with hydrochloric acid in an aqueous reaction system, said extractant solvent being selected from the group consisting of amides of the following general formulae

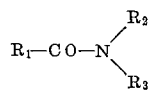 (I)

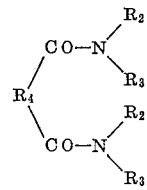

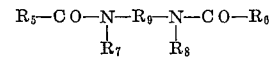 (III)

in which $R_1$, $R_5$, $R_6$, $R_7$ and $R_8$ are selected from the group consisting of hydrogen and hydrocarbon radicals; $R_2$ and $R_3$ are selected from the group consisting of hydrogen, hydrocarbon radicals, and hydrocarbon radicals forming part of an heterocyclic ring system which includes the nitrogen atom to which said $R_2$ and $R_3$ radicals are attached; $R_4$ is a hydrocarbon radical and $R_9$ is a divalent hydrocarbon radical; and separating the solvent extract layer from the aqueous reaction mixture.

2. A process according to claim 1, wherein the extractant solvent is a mixture of at least two different amides of the kind specified in claim 1.

3. A process according to claim 1, wherein the extractant solvent is a mixture of at least one amide of the kind specified in claim 1 with at least one other organic solvent.

4. A process according to claim 1, comprising the further step of admixing a water-immiscible organic solvent to the solvent extract separated from the aqueous reaction mixture and thereby producing an aqueous phase containing virtually the whole amount of extracted phosphoric acid as a distinct layer, separating said aqueous phase from the solvent phase and recovering the hydrochloric acid from the aqueous phase.

5. A process according to claim 1, comprising the further steps of subjecting the solvent extract to extraction with water, thereby to obtain an aqueous solution of phosphoric and hydrochloric acids, and separating said aqueous solution from the extracted solvent extract.

6. A process according to claim 1, comprising the further steps of submitting the solvent extract to a thermal treatment for the separation of the solvent and the extracted hydrochloric acid from a residue containing the extracted phosphoric acid.

7. A process according to claim 1, wherein the extraction of the aqueous reaction mixture is effected at a temperature at which the solubility of phosphoric acid in the amide solvent is higher than it is at lower temperatures, and after the separation of the extract from the aqueous reaction mixture the temperature of the extract is lowered for reducing the solubility of the phosphoric acid in the solvent.

8. A process for recovering phosphoric acid which comprises reacting tricalcium phosphate with aqueous hydrochloric acid to produce an aqueous reaction mixture comprising phosphoric acid and calcium chloride and extracting said phosphoric acid from the reaction mixture with dibutyl acetamide.

9. A process for recovering phosphoric acid which comprises reacting tricalcium phosphate with aqueous hydrochloric acid to produce an aqueous reaction mixture comprising phosphoric acid and calcium chloride and extracting said phosphoric acid from the reaction mixture with dimethylcaprylamide.

10. A process for recovering phosphoric acid which comprises reacting tricalcium phosphate with aqueous hydrochloric acid to produce an aqueous reaction mixture comprising phosphoric acid and calcium chloride and extracting said phosphoric acid from the reaction mixture with propylcaproamide.

11. A process for recovering phosphoric acid which comprises reacting tricalcium phosphate with aqueous hydrochloric acid to produce an aqueous reaction mixture comprising phosphoric acid and calcium chloride and extracting said phosphoric acid from the reaction mixture with cyclohexylcaproamide.

12. A process for recovering phosphoric acid which comprises reacting tricalcium phosphate with aqueous hydrochloric acid to produce an aqueous reaction mixture comprising phosphoric acid and calcium chloride and extracting said phosphoric acid from the reaction mixture with tolyloleamide.

13. A process for recovering phosphoric acid which comprises reacting tricalcium phosphate with aqueous hydrochloric acid to produce an aqueous reaction mixture comprising phosphoric acid and calcium chloride and extracting said phosphoric acid from the reaction mixture with caproylmorpholine.

14. A process for recovering phosphoric acid which comprises reacting tricalcium phosphate with aqueous hydrochloric acid to produce an aqueous reaction mixture comprising phosphoric acid and calcium chloride and extracting said phosphoric acid from the reaction mixture with ethylene-bis-propionamide.

References Cited by the Examiner
UNITED STATES PATENTS

| 2,880,063 | 3/1959 | Baniel et al. | 23—165 |
| 3,072,460 | 1/1963 | Young et al. | 23—165 |

OSCAR R. VERTIZ, *Primary Examiner.*

MAURICE A. BRINDISI, O. F. CRUTCHFIED,
*Assistant Examiners.*